United States Patent [19]

Newell

[11] 4,028,593

[45] June 7, 1977

[54] MOTOR CONTROL CIRCUIT

[75] Inventor: Dennis E. Newell, El Segundo, Calif.

[73] Assignee: Robertshaw Controls Company, Richmond, Va.

[22] Filed: Jan. 15, 1976

[21] Appl. No.: 649,291

[52] U.S. Cl. .................................. 361/27; 62/158; 62/217; 361/29; 318/471; 318/481

[51] Int. Cl.² ........................................ H02H 7/08

[58] Field of Search ............ 317/13 A, 13 R, 13 C, 317/41, 36 TD, 22, 141; 62/158, 330, 217; 318/484, 471, 472, 473, 481

[56] References Cited

UNITED STATES PATENTS

| | | |
|---|---|---|
| 3,585,451 | 6/1971 | Day ................................. 317/13 C |
| 3,673,811 | 7/1972 | Adams et al. ........................ 62/158 |
| 3,700,914 | 10/1972 | Granieri et al. ............... 318/484 X |
| 3,742,302 | 6/1973 | Neill ................................. 317/13 R |
| 3,742,303 | 6/1973 | Dageford ......................... 317/13 A |
| 3,753,043 | 8/1973 | Plouffe ........................... 317/13 A |

*Primary Examiner*—J D Miller
*Assistant Examiner*—Patrick R. Salce
*Attorney, Agent, or Firm*—O'Brien & Marks

[57] ABSTRACT

A control circuit for a motor usable in a refrigeration system has a variety of condition sensors including means to sense a low refrigerant pressure and timing means to override the sensing of low refrigerant pressure for a time period during motor start-up. A lockout circuit prevents re-start of the motor following a fault condition.

21 Claims, 3 Drawing Figures

MOTOR CONTROL CIRCUIT

BACKGROUND OF THE INVENTION

1. Field of the Invention:

The present invention relates to control circuits for controlling the operation of a motor and is particularly adapted for use with a compressor motor in a refrigeration system.

2. Description of the Prior Art:

The prior art, as exemplified by U.S. Pat. Nos. 3,636,369, 3,673,811, 3,700,914 and 3,792,592, is generally cognizant of motor control systems including low pressure responsive devices where a time delay means is provided to override the low pressure response for a time period upon motor start-up.

SUMMARY OF THE INVENTION

The present invention is summarized in that a motor control circuit for use with a motor in a refrigeration system includes relay means to selectively energize the motor, first and second transistors both connected to the relay means so that each can inhibit its operation, a temperature responsive circuit responsive to the temperature inside the motor to cause the first transistor to inhibit the operation of the relay means in the event of a high temperature condition, a delay after break timer to cause the second transistor to inhibit relay means operation for a predetermined period after any shut down of the motor, a refrigerant pressure responsive circuit to trigger the delay after break timer if the refrigerant pressure is insufficient, and a lock-out circuit responsive to actuation of the temperature responsive circuit or the refrigerant pressure responsive circuit to cause the second transistor to inhibit relay means operation following a fault condition.

It is an object of the present invention to provide a control circuit for a motor which includes a low refrigerant pressure switch and reliable solid state timing means to prevent sensing of low refrigerant pressure from interfering with motor operation for a time period after motor start-up.

It is another object of the present invention to provide such a control circuit wherein there is further included other condition responsive means and a lock out circuit responsive to the sensing of any fault condition to prevent motor operation.

It is another object of the invention to construct such a control circuit which further includes a delay after break timer to prevent restart of the motor for a fixed period after any shut-down.

Still other objects, features and advantages of the present invention will become apparent in the following description when taken in conjunction with the acconpanying drawings.

DESCRIPTION OF THE PREFERRED EMBODIMENT

Figure 1:
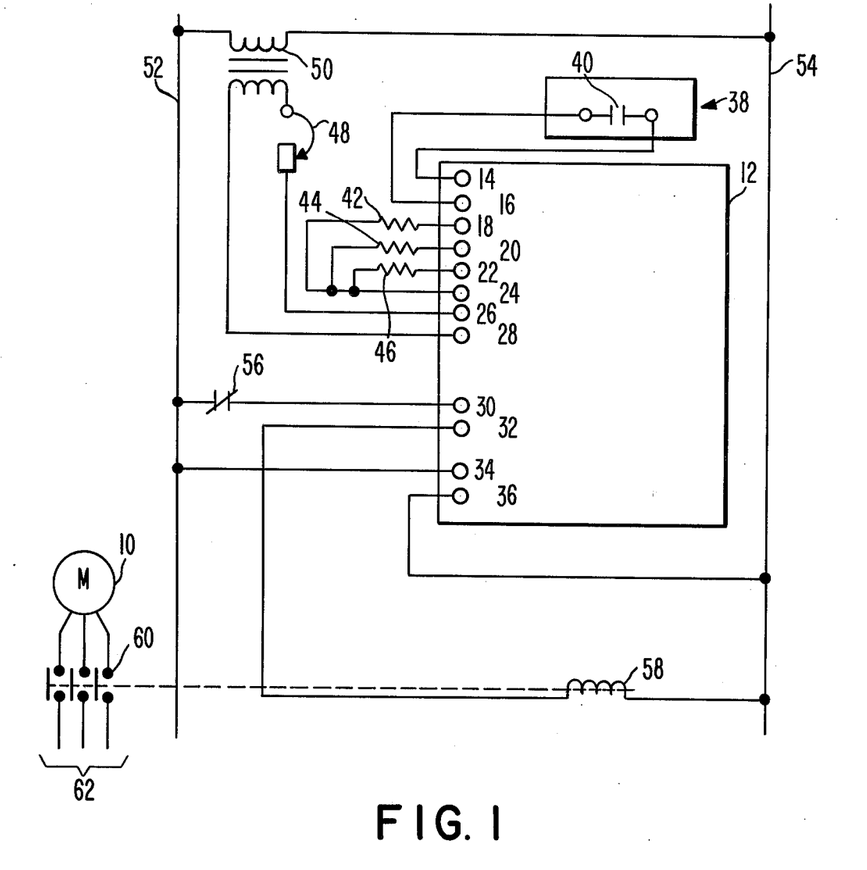
FIG. 1 is a circuit schematic of a control circuit constructed according to the present invention.

As shown in FIG. 1, the present invention is embodied in a load control circuit, such as a motor protector, suitable for controlling a three phase compressor motor 10 used in a refrigeration system. A motor control circuit housing 12 has provided thereon a plurality of external terminals 14, 16, 18, 20, 22, 24, 26, 28, 30, 32, 34 and 36. Connected between the terminals 14 and 16 is a normally closed refrigerant-low-pressure-responsive switch, generally indicated at 38, which has therein a pair of contacts 40 which are closed as long as the pressure of the refrigerant in the refrigeration system exceeds a minimum value. Each of three thermally sensitive resistances 42, 44, and 46 has one of its ends tied to respective one of the terminals 18, 20 and 22. The remaining end of each of the thermally sensitive resistances 42, 44 and 46 are all commonly joined to the terminal 24. The thermally sensitive resistances 42, 44 and 46 are typically lengths of positive temperature coefficient wire each embedded in a respective phase winding of the compressor motor 10. Connected to the terminal 26 is one side of a thermostatic switch 48, the other side of which is connected to the secondary winding of a transformer 50. The secondary winding of the transformer 50 is also connected at its other end directly to the terminal 28. The primary winding of the transformer 50 is connected between a pair of AC power lines 52 and 54. The terminal 30 is attached to the AC power line 52 through a control switch 56 which is typically a high refrigerant pressure limit switch. The terminal 32 is connected through a contactor winding 58 to the AC power line 54. The contactor winding 58 controls the operation of three ganged main motor contacts 60 which serve to connect the motor 10 to a source of three phase AC power 62. The terminal 34 is connected directly to the AC power line 52 while the terminal 36 is connected directly to the power line 54.

The portion of a motor protection system enclosed in the housing 12 is shown in more detail in FIG. 2. Included in the circuitru inside of the housing 12 is a switching circuit indicated generally at 64, a cold start timer generally indicated at 66, a thermally responsive circuit generally indicated at 68, a delay after break timer indicated generally at 70, and a limit lock-out circuit generally indicated at 72.

In the switching circuit 64, a triac 74 is connected with its main terminals attached between the terminals 32 and 30. Wired in parallel between the main terminals of the triac 74 is a series circuit of a resistor 76 and a capacitor 78. The resistor 76 and the capacitor 78 have values selected so as to limit the rise time of voltage across the triac 74 to help prevent false triggering. Wired to the gate of the triac 74 is one end of the resistor 80 the other end of which is connected through a contact arm 82 of a power control relay 84 to one of the main terminals of the triac 74.

Figure 2A:
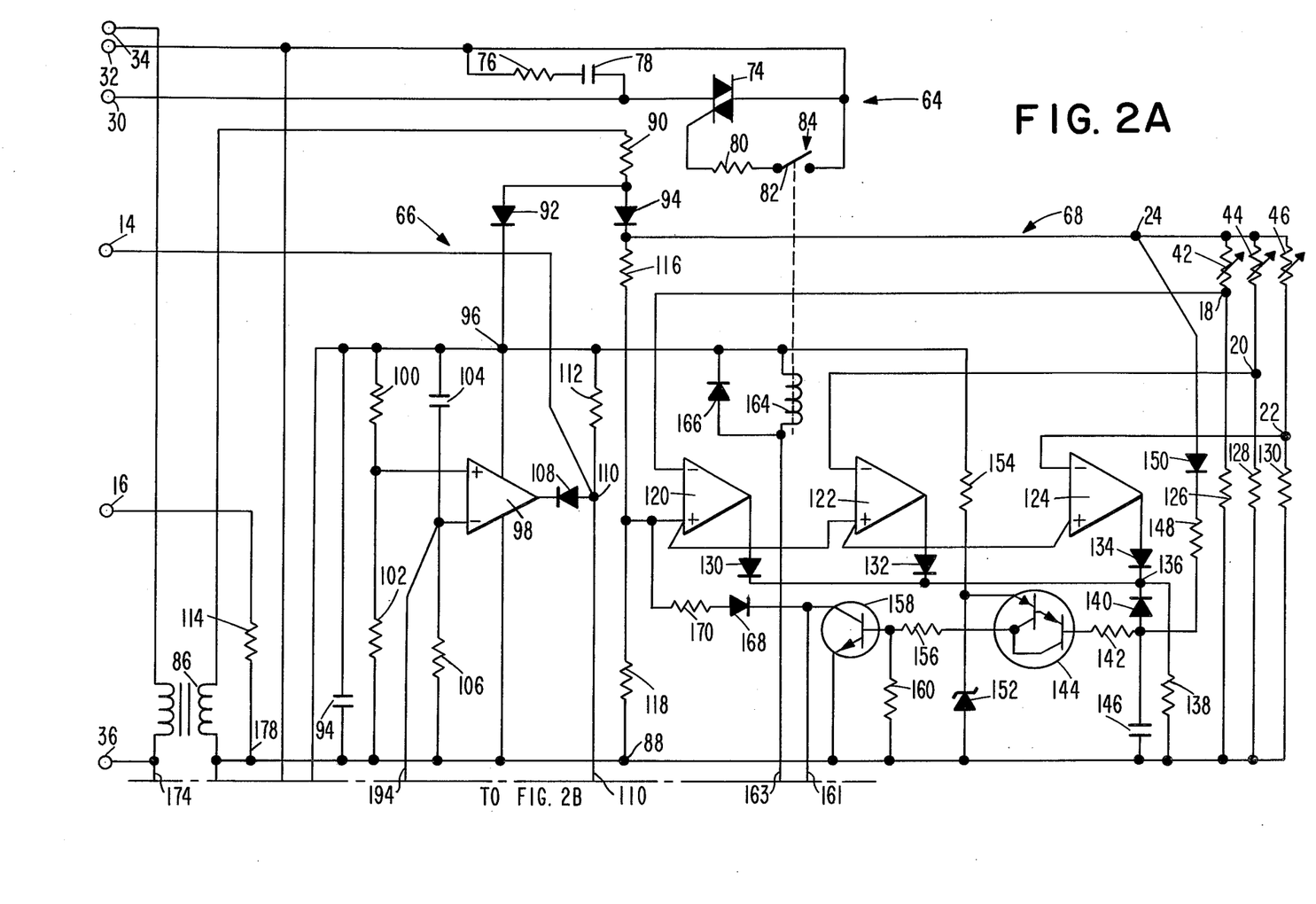
FIG. 2 is a circuit schematic is the portion of the circuit of FIG. 1 within the housing.

Connected between the terminals 34 and 36 is the primary winding of a transformer 86, the secondary of which is connected to supply voltage to the circuitry of FIG. 2A. One end of the secondary winding of the transformer 86 is connected to a ground node 88. The other end of the secondary of the transformer 86 is connected through a voltage dropping resistor 90 to the anodes of a pair of rectifying diodes 92 and 94. The cathode of the diode 92 is connected to one plate of a capacitor 94, the other plate of which is connected to the ground 88. The capacitor 94 serves to create a positive, filtered DC voltage at a DC voltage node 96.

In the cold start timer 66, receiving its bias from the voltage node 96 and the ground 88 is an operational amplifier 98. A non-inverting input to the operational amplifier 98 is wired to the junction of a pair of voltage dividing resistors 100 and 102 which are connected as a series circuit across the capacitor 94. An inverting input to the operational amplifier is connected to a timing circuit including a timing capacitor 104, and a timing resistor 106. The timing capacitor 104 is also wired to the voltage node 96 just as the timing resistor 106 is also connected to the ground 88. The output of the operational amplifier 98 is wired to the cathode of a diode 108, the anode of which is attached to a circuit junction 110. The circuit junction 110 is connected directly to the terminal 14 and is also connected through a resistor 112 to the voltage node 96. The terminal 16 is connected through a resistor 114 directly to the ground 88.

The cathode of the diode 94 in the thermal protection circuit 68 is joined to a voltage dividing resistor 116 which attached in turn to a voltage dividing resistor 118 which is connected to the ground 88. The junction of the voltage dividing resistors 116 and 118 is connected a non-inverting input of each of operational amplifiers 120, 122 and 124. An inverting input of each of the operational amplifiers 120, 122, and 124 is joined to a respective one of the terminals 18, 20 and 22 which are connected to a respective one of the thermally sensitive resistances 42, 44 and 46. The terminals 18, 20 and 22 are also joined to the ground 88 through respective reference resistors 126, 128 and 130. The terminal 24, which is connected to each of the thermally sensitive resistances 42, 44 and 46 is also wired directly to the cathode of the diode 94. The output of each of the operational amplifiers 120, 122 and 124 is connected to the anode of a respective one of diodes 130, 132 and 134, the cathodes of which are all commonly joined to an OR-circuit junction 136. The OR-circuit junction 136 is connected to the ground 88 through a resistor 138. The OR-circuit junction 136 is also tied to the cathode of a diode 140, the anode of which connects through a resistor 142 to the base of a Darlington amplifier 144. The junction of the resistor 142 and the diode 140 is also wired both to one plate of a capacitor 146, the other plate of which connects to the ground 88, and to a resistor 148 wired to the cathode of a diode 150, the anode of which is connected directly to the terminal 24. The Darlington amplifier 144, which includes a pair of PNP transistors, has the output emitter of the amplifier wired to the cathode of the zener diode 152, the anode of which connects to the ground 88. The cathode of the zener diode 152 is also joined to the voltage node 96 through a resistor 154. The tied collectors of the transistors of the Darlington amplifier 144 are tied through a resistor 156 to the base of a switching transistor 158. The junction of the resistor 156 and the base of the transistor 158 is also connected through a resistor 160 to the ground 88. The transistor 158, which is an NPN transistor, has its emitter tied to the ground 88 and has its collector tied by a conductor 161 to the emitter of a switching transistor 162, the collector of which is connected through a conductor 163 and through a relay coil 164 to the voltage node 96. The relay coil 164 which has a diode 166 connected across it to protect it from transients, controls the operation of the contact arm 82 of the relay 84. The collector of the switching transistor 158 is also tied to the cathode of a diode 168, the anode of which connects through a resistor 170 to the junction of the voltage dividing resistors 116 and 118.

Figure 2B:
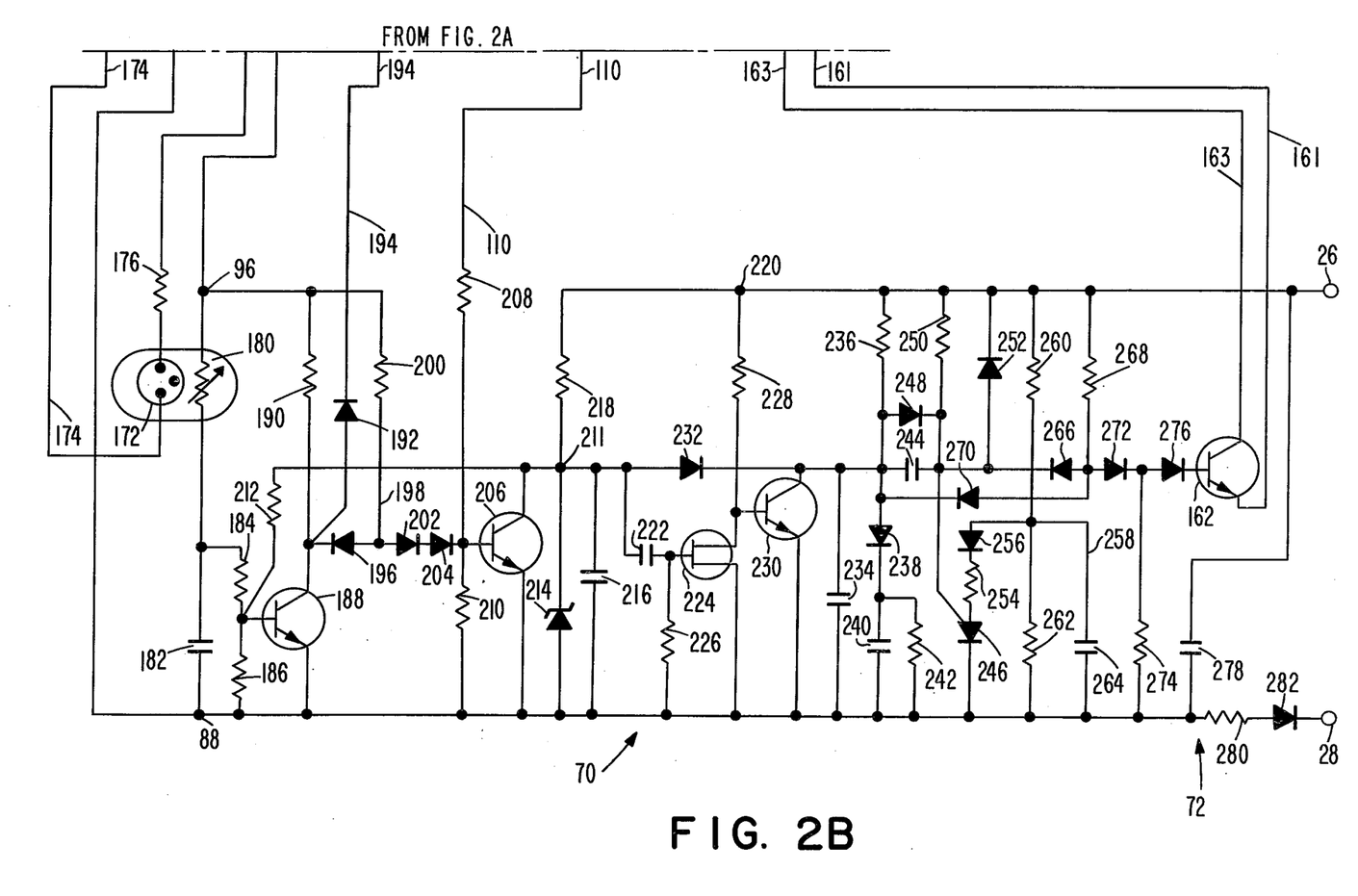

As shown in FIG. 2B a neon lamp 172 has one side connected to a conductor 174 which is connected directly to the terminal 36. The other side of the neon lamp 172 connects through a voltage limiting resistor 176 and a conductor 178 to the terminal 32. The neon lamp 172 is located in proximity to a light sensitive resistance 180 such that when the neon lamp 172 is lit, the resistance of the light sensitive resistance 180 is low, and when the lamp 172 is dim, the resistance of the light sensitive resistance 180 is high. One end of the light sensitive resistance 180 is connected to the voltage node 96 while the other end is connected to one plate of a capacitor 182, the other plate of which is attached to the ground 88. Connected across the capacitor 182 is the series connection of a pair of resistors 184 and 186. Wired to the junction of the pair of resistors 184 and 186 is a base of an NPN switching transistor 188. The transistor 188 has its emitter connected to the ground 88 and its collector wired through a resistor 190 to the voltage node 96. The collector of the transistor 188 is also connected to the anode of a diode 192, the cathode of which connects through a conductor 194 to the inverting input of the operational amplifier 98. Also joined to the collector of the transistor 188 is the cathode of a diode 196, the anode of which connects to a circuit junction 198 which is connected to the voltage node 96 by a resistor 200.

In the delay after break timer 70, the circuit junction 198 is joined through a pair of diodes 202 and 204 to the base of an NPN switching transistor 206 with the anodes of each of the diodes 202 and 204 facing toward the circuit junction 198. The base of the transistor 206 is also wired to the junction of a pair of resistors 208 and 210, with the resistor 208 being also connected to the circuit junction 110 and the resistor 210 being also connected to the ground 88. The transistor 206 also has its emitter attached directly to the ground 88 and its collector wired to a circuit junction 211 which connects through a resistor 212 to the base of the transistor 188. Wired between the circuit junction 211 and the ground 88 is a zener diode 214 with its cathode wired to the circuit junction 211. A capacitor 216 is connected in parallel with the zener diode 214. The circuit junction 211 is also joined to one end of a resistor 218, the other end of which is joined to a supply voltage node 220 connected directly to the terminal 36. The circuit junction 211 is also connected to the one plate of a capacitor 222, the other plate of which is connected to the gate electrode of a field effect transistor (FET) 224. The gate of the FET 224 is also wired to the ground 88 through a resistor 226. The drain of the FET 224 is connected to a resistance 228 which is also connected to the voltage node 220. The source of the FET 224 is connected to the ground 88, and the drain of the FET 224 is also connected to the base of an NPN switching transistor 230. The transistor 230 has its emitter tied to the ground 88 and its collector tied to the cathode of a diode 232, the anode of which is connected to the circuit junction 211. Connected between the collector and emitter of the transistor 230 is a capacitor 234.

In the limit lock-out circuit 72, a resistor 236 joins the collector of the transistor 230 to the voltage node 220. A diode 238 has its anode joined to the collector of the transistor 230, and its cathode connected to one plate of a capacitor 240, the other plate of which is connected to the ground 88. A resistor 242 is attached in parallel across the capacitor 240. The collector of the transistor 230 is wired to one plate of a capacitor 244, the other plate of which is wired to the gate of a programmable unijunction transistor (PUT) 246. Connected across the capacitor 244 with its cathode toward the gate of the PUT 246 is a diode 248. The gate terminal of the PUT 246 is also joined to the voltage node 220 by a resistor 250. A diode 252 is connected across the resistor 250 with its cathode joined to the voltage node 220. The cathode of the PUT 246 is connected directly to ground while the anode of the PUT 246 is connected through a resistor 254 and through a light emitting diode (LED) 256 to a circuit junction 258. The LED 256 is located in the exterior of the housing 12 of the motor control circuit so it is visible to an observer. The circuit junction 258 is joined to the voltage node 220 by a resistor 260 and to the ground 88 by a resistor 262. A capacitor 264 is connected in parallel across the resistor 262. The gate of the PUT 246 is also connected to the cathode of a diode 266, the anode of which is wired to the voltage node 220 through a resistor 268. A diode 270 has its anode attached to the anode of the diode 266 and its cathode attached to the anode of the diode 238. A diode 272 has its anode also connected to the anode of the diode 266 and has its cathode connected through a resistor 274 to the ground 88 and through a diode 276 to the base of the transistor 162. A capacitor 278 is connected between the voltage node 220 and the ground 88 to filter voltage at the voltage node 220 to create a positive voltage at the voltage node. The ground 88 is connected through a resistor 280 and a diode 282 to the terminal 28 with the cathode of the diode being connected to the terminal 28, so that alternating voltage supplied between the terminals 26 and 28 can be rectified by the diode 282 to keep the capacitor 278 fully charged.

In the general operation of the circuitry of FIG. 2, the switching circuit 64 through the triac 74, controls the operation of the motor 10. The triac 74 is in turn controlled by the relay 84 which is actuated when both of the transistors 158 and 162 are conductive. The transistor 158 has its operation controlled by the thermal responsive circuit 68 while the transistor 162 is responsive to the circuitry of both the delay after break timer 70, which receives input from the cold start timer 66, and the limit lock-out, generally indicated at 72. The thermal responsive circuit 68 prevents motor overheat. The cold start timer 66 allows a temporary override of the low refrigerant pressure switch 38 for cold weather starting. The delay after break timer 70 prevents rapid restart after motor turn-off to inhibit damaging motor twiddling. And the limit lock-out circuit 72 is designed to prevent automatic restart of the motor in the event of a failure signal by one of the other protection devices or circuits so that manual attention would be required to clear a major system malfunction. All of this will be explained in greater detail below.

The motor 10 is energized by the three ganged main motor contacts 60 controlled by the contactor winding 58. The contactor winding receives energization current out of the terminal 32, which current is gated on or off by the triac 74. The triac operation is controlled by the position of the contact arm 82 of the relay 84, the resistor 80 serving to limit current flow to the triac 74. The high limit switch 56, also in series with the triac 74 and the contactor winding 58 between the power lines 52 and 54, serves to prevent motor operation by opening in the event the refrigerant pressure at the output of the compressor run by the motor 10 becomes too high.

The thermal responsive circuit 68 monitors the temperature in each of the phase windings of the motor 10 to prevent current flow through the transistors 158 in the event of a high temperature condition. The operational amplifier 120 compares the voltage at its non-inverting input, which is a fixed voltage from the voltage divider resistors 116 and 118, with the voltage at its inverting input, which is a variable voltage created between the thermally responsive resistance 42 and the fixed reference resistor 126, to create a normally low signal (because the thermally responsive resistance 42 normally has a low resistance) which goes high when a high temperature condition occurs. Similarly the operational amplifiers 122 and 124 compare voltages between the fixed voltage from the resistors 116 and 118 and the condition responsive voltages between the respective pairs of resistors 44 and 128, and 46 and 130. When any one of the operational amplifiers 120, 122 or 124 drives its output high, it forward biases the respective one of the diodes 130, 132 and 134 connected to it to pull the OR-circuit junction 136 high thereby reverse biasing the diode 140 and preventing the resistor 138 from keeping the capacitor 146 discharged. This allows current flow through the diode 150 and the resistor 148 to charge the capacitor 146 to raise the voltage at the base of the Darlington amplifier 144, pulling the base above the voltage at the emitter, which is fixed by the reverse biased zener diode 152, to turn off the normally conductive Darlington amplifier 144. The current from the Darlington amplifier 144 normally flows through the resistors 156 and 160 to drive the transistor 158 into conduction, so when the Darlington amplifier 144 is off, the transistor 158 is off, and the relay 84 goes open to turn off the motor 10. The diode 168 and the resistor 170 are provided so that they lower the fixed voltage between the resistors 116 and 118 when the transistor 158 is conductive so that higher temperature at any one of the resistances 42, 44 or 46 is needed to turn the motor off while it is running then is needed to prevent initial start-up due to high temperatures.

In the cold start timer 66, the operational amplifier 98 receives its biasing supply voltage from the filtered DC voltage created across the capacitor 94 through the voltage node 96 and the ground 88. The fixed voltage divider resistors 100 and 102 created a stable constant voltage at the non-inverting input to the operational amplifier 98 which is compared to the voltage at the inverting input. This voltage is created at the junction of the capacitor 104 and the resistor 106 which tend to create a logarithmically decreasing voltage at their junction as long as no current flows through the diode 192. However, should the transistor 188 be non-conductive, the resistor 190 will pull the anode of the diode 192 high to forward bias the diode 192 to discharge the capacitor 104 and hold the inverting input of the operational amplifier 98 high. The state of conduction of the transistor 188 is controlled by the light sensitive resistance 180 which is in turn controlled by the neon lamp 172. The neon lamp 172 is wired through the terminals 36 and 32 so as to be wired in parallel with the contactor winding 58 so that when the winding is energized a voltage appears across the lamp 172 so that it is lit and when the contactor winding 58 is off, the lamp 172 is also off. Thus, if the contactor winding 58 is on and the lamp 172 is on the conductivity of the light sensitive resistance 180 becomes greater thereby allowing currentflow therethrough to forward bias the base of the transistor 188 through resistors 184 and 186 to turn the transistor 188 on. The capacitor 182 serves to filter out the transient fluctuations of the resistance 180 to prevent false triggering of the transistor 188 due to the flickering of the neon lamp 172 which is lit by an AC voltage. When the transistor 188 becomes conductive, the diode 192 is reversed biased and the capacitor 104 begins to charge through the resistor 106. After a preselected time period, determined by the values of the resistor 106 and the capacitor 104, the inverting input of the operational amplifier 98 falls below the non-inverting input to cause the normally low output of the operational amplifier 98 to be driven high. A high at the circuit junction 110 may occur when the operational amplifier 98 fails to pull its output low due to current flow through the resistor 112. A high at the circuit junction 110 would cause the transistor 162 to be turned off to remove power to the motor 10 as will be described below in detail.

However, connected between the circuit junction 110 and the ground 88 by way of the terminals 14 and 16 is the low refrigerant pressure switch 38. Whenever there is sufficient refrigerant pressure in the refrigeration line the contacts 40 of the switch 38 will be closed connecting, in effect, the terminal 14 to the terminal 16 to introduce the resistor 114 between the circuit junction 110 and the ground 88 to pull the circuit junction 110 low. This will prevent the operational amplifier 98 from allowing the circuit junction 110 to go high to turn off the motor. Since refrigerant pressure is normally high enough to cause the contacts 40 to be closed even if the motor is off, the operational amplifier 98 and the time delay from the capacitor 104 and the resistor 106 will normally have no effect. However in extremely cold weather the pressure in the refrigeration lines may drop sufficiently to open the contacts 40. The cold start timer 66 therefore functions to provide a holding or override action to hold the circuit junction 110 at a low level during a cold weather-low refrigerant pressure condition to allow the low pressure switch 38 a time delay, determined by the capacitor 104 and the resistor 106, in which time the refrigerant pressure can rise sufficiently after start-up to close the contacts 40. If the contacts 40 do not close during the delay time, the operational amplifier 98 will take its output high thereby allowing the circuit junction 110 high to shut down the motor as will be shown.

The start of conduction of the transistor 206 triggers the delay after break timer 70 by lowering the voltage at the circuit junction 211. The transistor 206 can be turned on by having base drive supplied through either the resistor 208 from the circuit junction 110 or the resistor 200 through the diodes 202 and 204. As is described above current flow from the circuit junction 110 indicates a low refrigerant pressure condition. Current flow through the resistor 200 indicates that one of the other controls has turned off the motor. When the motor is operating, the transistor 188 is conductive and current from the resistor 200 flows through the diode 196 and the transistor 188. When the motor stops, the transistor 188 goes off and the current from the resistor 200 flows through the diodes 202 and 204 to supply base drive current to the transistor 206 to turn it on and pull the circuit junction 211 low.

As will be shown, a low at the circuit junction 211 actuates the delay after break timer 70. Besides the turning on of the transistor 206 there is one other way the voltage at the circuit junction 211 can be lowered. That is if the DC supply voltage created at the voltage node 220 is removed. AC voltage is supplied by the transformer 150 through the thermostatic switch 48, is rectified by the diode 282 and filtered by the capacitor 278 to create the DC voltage at the voltage node 220. When the thermostatic switch 38 opens due to the satisfaction of the cooling demand, power is removed from the voltage node 220 and the delay after break timer 70 is triggered by the fall of the voltage at the circuit junction 211.

In the delay after break timer 70 itself, the zener diode 214 functions so that the voltage at the circuit junction 211 is normally at a constant 12 volts. The capacitor 222 normally rests fully charged, through the resistor 218, with a voltage of nearly 12 volts across it, and leakage current through the capacitor normally supplies the small current necessary to drive the forward biased FET 224 into conduction. The FET 224 which remains in conduction unless its gate is driven to a negative voltage, normally allows drain-to-source current flow through it to pull low the base of the transistor 230 to bias it off. The transistor 230 when it is conductive forward biases the diode 270 to pull all the current flowing through the resistor 268 therethrough to prevent base drive current from reaching the transistor 162 to turn it, and the motor 10, off. When the circuit junction 211 goes low due to either of the above described causes, the capacitor 222 remains charged and drives the gate of the FET 224 low to turn it off. This allows the base of the transistor 230 to be pulled high by the resistor 228, turning the transistor 230 on and turning the transistor 162 off. This condition will remain as long as the capacitor 222 is charged. The diode 232 is forward biased by the conduction of the transistor 230 so that the circuit junction 211 will remain pulled to a low level as long as the capacitor 222 remains sufficiently charged to hold the gate of the FET 224 at a negative level. Since the gate resistance of the FET 224 is very high, the discharge of the capacitor 222 will be almost completely through the resistor 226, so the time necessary for the capacitor discharge will be determined by the values of the capacitor 222 and the resistor 226. Values of the capacitor 222 and the resistor 226 that have been found to provide a delay time of approximately five minutes are 50 microfarads and 3.3 megohms respectively. During the entire delay time, until the capacitor 222 discharges enough for the gate of the FET 224 to be zero, or very close to it, the transistor 230 is held conductive and motor operation inhibited. The full delay time will occur even if the timer 70 delay is triggered by a loss of power due to either the opening of the thermostatic switch 38 or a power source failure. As power is restored, if the capacitor 222 has not been discharged, the FET 224 will remain off and the current through the resistor 228 will turn the transistor 230 on lowering the circuit junction 211 until the capacitance 222 is discharged.

Thus if motor operation is inhibited by any control, time delay after break timer 70 will ensure that a full predetermined time delay occurs before motor restart to prevent rapid start and stop which could cause rapid wear and other damage to the motor. This delay occurs even if the cause of the trigger of the motor shut-off has disappeared during the delay time.

The limit lockout circuit 72 functions to prevent re-start of the motor automatically when a fault condition has shut down the motor. The PUT 246 has its anode resting at a fixed voltage supplied by the voltage divider of the resistors 260 and 262 and will be triggered into conduction when the gate, which normally rests at a high voltage due to the resistor 250, becomes lowered in voltage. This occurs when the delay after break timer 70 triggers for any reason. The start of conduction of the transistor 230 will pull the voltage at the one plate of the capacitor 244 down so rapidly that a negatively going spike of voltage will be passed by the capacitor 244 to lower the voltage at the gate of the PUT 246 temporarily to trigger the PUT. The PUT 246 in its conductive state allows current flow both from its gate and its anode to its cathode thereby pulling the current from the resistor 268 through the diode 266 and the gate of the PUT 246 to prevent base drive to the transistor 162 to inhibit motor operation. At the same time current flows from the anode to cathode of the PUT 246 thereby pulling current through the LED 256 to light it to create a visible display. The lockout thus created can only be reset by disconnecting and then reconnecting the voltage to the circuit by opening and reclosing the thermostatic switch 48. As the voltage rises again at the voltage node 220, the capacitor 264 slows the rise of the voltage at the circuit junction 258 enough to ensure that the anode voltage rises slower than the gate voltage to prevent triggering the PUT 246 during rise of the voltage supply. The diode 248 functions to prevent recharing of the delay after break timer 70 during a lockout condition so that there is no time delay on lockout reset, by allowing the gate of the PUT 246 to pull low the circuit junction 211 by means of the diode 232. The diode 252 protects the gate of the PUT 246 from high going transient voltages transmitted through the capacitor 244. The capacitors 234 and 240 are to filter transients from the delay after break timer 70 to prevent them from triggering the PUT 246, the diode 238 serving to prevent the larger capacitor 240 from slowing the fall time of the collector of the transistor 230. The diode 270 allows the delay timer to continue to hold the motor off for the delay time period even if the limit lockout is reset during that period.

The diode 272 and the resistor 274 function to insure that the transistor 162 is turned off when current flow from the resistor 268 is diverted through either of the diodes 266 or 270. The diode 272 in conjunction with the resistor 274 raises the threshold voltage at the anode of the diode 272 necessary to bias the transistor 162 into conduction such that any voltage less than 2.2 volts will turn the transistor 162 off. Thus current flow through either the diode 266 and the PUT 246 or the diode 270 and the transistor 230, both of which will suffice to lower the anode of the diode 272 to below 2.2 volts, will ensure turn-off of the transistor 162. Inasmuch as the present invention is subject to many variations, modifications and changes in detail, it is intended that the foregoing specification and accompanying drawings be interpreted in an illustrative rather than a limiting sense.

What is claimed is:

1. In a control circuit for controlling a motor usable in a refrigeration system, the combination comprising
relay means to selectively energize the motor,
first and second transistors both connected to the relay means so that each can inhibit its operation,
a temperature responsive circuit responsive to the temperature inside the motor to cause the first transistor to inhibit operation of the relay means in the event of a high temperature condition,
a delay after break timer to cause the second transistor to inhibit relay means operation for a predetermined period after any shut down of the motor,
a refrigerant pressure responsive circuit to trigger the delay after break timer if the refrigerant pressure is insufficient, and
a lock-out circuit responsive to actuation of the temperature responsive circuit or the refrigerant pressure responsive circuit to cause the second transistor to inhibit relay means operation following a fault condition.

2. A control circuit as claimed in claim 1 wherein there is further included a thermostatic switch through which power is supplied to the delay after break timer and the lock-out circuit and which switch opens upon satisfaction of the refrigeration demand, an opening of the thermostatic switch serving to reset the lock-out circuit.

3. A control circuit as claimed in claim 1 wherein the relay means includes a relay with a coil, a triac actuated by the relay, and a contactor actuated by the triac with power to the motor being supplied through the contactor.

4. A control circuit as claimed in claim 3 wherein both the first and second transistors are connected in series with the coil of the relay.

5. A control circuit as claimed in claim 3 wherein there is a high pressure limit switch connected in series with the triac to prevent energization of the motor if refrigerant pressure is excessive.

6. A control circuit for controlling a compressor motor in a refrigeration system comprising
switching means to energize the motor,
a delay after break timer connected to the switching means to inhibit motor operation for a predetermined time delay,
a circuit junction connected to the delay after break timer,
an operational amplifier having its output connected to the circuit junction,
a timing circuit connected to the operational amplifier to cause its output to change state following a timing period after motor start up, and
a low refrigerant pressure switch connected to the circuit junction to prevent the output of the operational amplifier from triggering the delay after break timer through the circuit junction if the refrigerant pressure is above a minimum.

7. A control circuit as claimed in claim 6 wherein there is an optical isolator responsive to the energization of the motor and there is a switching device connecting the optical isolator to the timing circuit to prevent the timing circuit from switching the operational amplifier when the motor is not energized.

8. A control circuit as claimed in claim 7 wherein the switching device also triggers the delay after break timer when the motor is de-energized.

9. A control circuit as claimed in claim 8 wherein the switching device is a transistor which has its base drive controlled by the optical isolator.

10. A control circuit as claims in claim 9 wherein the timing circuit includes a resistor and a capacitor in series and where the switching device holds the capacitor discharged when the motor is not energized.

11. A control circuit as claimed in claim 7 wherein the delay after break timer includes a first transistor the base of which is connected to the circuit junction.

12. A control circuit as claimed in claim 11 wherein there is a field effect transistor and a capacitor in the delay after break timer, the capacitor connected between the first transistor and the field effect transistor and the field effect transistor connected to the switching means so that when the first transistor becomes conductive, the field effect transistor is biased off the de-energize the motor.

13. A control circuit as claimed in claim 12 wherein there is a resistor connected to the capacitor to provide a timed discharge thereof to allow the field effect transistor to return to conductivity after a predetermined delay.

14. A control circuit as claimed in claim 7 wherein the switching means includes a relay with a coil, first and second transistors in series with the coil of the relay, a triac controlled by the relay, and a contactor controlled by the triac to supply power directly to the motor.

15. A control circuit as claimed in claim 7 further including a thermostatic switch through which power is supplied to the delay after break timer and responsive to satisfaction of refrigeration demand to remove power from the delay after break timer to turn off the motor and initiate the time delay.

16. A control circuit for controlling a motor for use in a refrigeration system comprising
switching means to selectively energize the motor,
fault condition responsive means responsive to excessive system conditions to de-energize the switching means,
a thermostatic switch responsive to satisfaction of the refrigeration demand,
a lock-out circuit receiving power through the thermostatic switch and responsive to activation of the fault condition responsive means to prevent reenergization of the switching means until reset by removing power therefrom by operating the thermostatic switch,
the lock-out circuit including a programmable unijunction transistor which is triggered into conduction to prevent reenergization of the switching means,
a light emitting diode connected in series with one of the electrodes of the programmable unijunction transistor to provide a visual display when the programmable unijunction transistor is conducting.

17. A control circuit for controlling a motor for use in a refrigeration system comprising
switching means to selectively energize the motor,
fault condition responsive means responsive to excessive system conditions to de-energize the switching means,
a thermostatic switch responsive to satisfaction of the refrigeration demand,
a lock-out circuit receiving power through the thermostatic switch and responsive to activation of the fault condition responsive means to prevent reenergization of the switching means until reset by removing power therefrom by operating the thermostatic switch,
the lock-out circuit including a programmable unijunction transistor which is triggered into conduction to prevent reenergization of the switching means, and
a resistive voltage divider connected to the anode and a resistor connected to the gate of the programmable unijunction transistor to normally keep it in a non-conductive state.

18. A control circuit as claimed in claim 17 further including a capacitor connected to the resistive voltage divider to slow the rise of the voltage thereat when power is supplied to the circuit to ensure non-conduction by the programmable unijunction transistor.

19. A control circuit as claimed in claim 18 further including a delay after break timer and a capacitor connecting the delay after break timer to the gate of the programmable unijunction transistor to trigger it into conduction when the delay after break timer is actuated.

20. A control circuit as claimed in claim 19 wherein the switching means includes a transistor whose base drive current is diverted by the programmable unijunction transistor when it is conducting to bias the transistor and thereby the switching means off.

21. A control circuit for controlling a motor for use in a refrigeration system, the combination comprising
a contactor connected to selectively energize the motor,
a triac connected to control the activation of the contactor,
a relay having a relay coil and connected to control the operation of the triac,
first and second transistors connected in series with the relay coil to prevent operation of the relay when either of the transistors is non-conductive.
an OR-circuit connected to the first transistor to control the conductivity thereof,
three operational amplifiers the outputs of which are all connected to the OR-circuit junction so that each may inhibit the conductivity of the first transistor,
a fixed resistive voltage divider connected to one input of each of the operational amplifiers,
a temperature sensitive resistance connected to another input of each of the operational amplifiers to cause the operational amplifiers to be responsive to temperature,
a first resistor connected to supply base drive to the second transistor,
a third transistor connected so as to prevent the third resistor from supplying drive current to the second transistor when the third transistor is conductive,
a field effect transistor controlling the conductivity of the third transistor,
a first capacitor connected to the gate of the field effect transistor to control the conductivity thereof,
a second resistor connected to the first capacitor to provide a discharge path therefore,
a circuit junction to which the first capacitor is also attached,
a fourth transistor connected to the circuit junction to pull the circuit junction low to bias the field effect transistor off to turn the motor off while the first capacitor discharges through the second resistor,
a third resistor to supply base drive current to the fourth transistor,
a fifth transistor connected to the third resistor to control the fourth transistor by removing the base drive current thereto, an optical isolator responsive to the operation of the contactor and controlling the operation of the fifth transistor to turn it on when the contactor is energized, a fourth operational amplifier connected to the fourth transistor so as to be able to drive it into conduction regardless of the operation of the fifth transistor, timing means connected to the fourth operational amplifier to switch the output thereof after a predetermined period of time, a refrigerant pressure responsive switch connected to the operational amplifier to prevent it from supplying drive current to the fourth transistor is the refrigerant pressure is above a minimum, a lock-out circuit connected to the third transistor and the second transistor so as to prevent conduction by the second transistor following triggering by the third transistor, a programmable unijunction transistor in the lock out circuit, a second capacitor connecting the third transistor to the gate of the programmable unijunction transistor to trigger it into conduction when the third transistor becomes conductive, a second voltage divider, a light emitting diode connecting the second voltage divider with the anode of the programmable unijunction transistor to provide a visual display when the unijunction transistor is conductive, and a thermostatic switch through which voltage is supplied to the first resistor and to the circuit junction to prevent conduction by the second transistor and to pull the circuit junction low when the refrigeration demand is satisfied.

* * * * *